United States Patent

[11] 3,601,527

[72] Inventors James P. Markham
 Milford, N.H.;
 John F. Jost, Glastonbury, Conn.
[21] Appl. No. 15,991
[22] Filed Mar. 3, 1970
[45] Patented Aug. 24, 1971
[73] Assignee Synthetic Products Mfg. Corp.
 Leominster, Mass.

[54] AERIAL CABLE TIE
 8 Claims, 14 Drawing Figs.
[52] U.S. Cl. .................................................. 174/173,
 24/81 KK, 248/74 PB
[51] Int. Cl. ................................................ H01b 17/22
[50] Field of Search .......................................... 174/172,
 173; 248/74 PB; 256/57; 24/16 BP, 30.5 P, 73 SA,
 81 KK

[56] References Cited
UNITED STATES PATENTS

| 2,116,957 | 5/1938 | Barnes | 174/172 UX |
| 2,453,319 | 11/1948 | Hollyday, Jr. | 174/173 UX |
| 3,460,787 | 8/1969 | Petze, Jr. | 174/173 X |
| 3,529,795 | 9/1970 | Van Niel | 248/74 PB X |

Primary Examiner—Laramie E. Askin
Attorney—Frederick D. Goode

ABSTRACT: This disclosure generally relates to an elastomeric fastener or "tie" which is used by the electrical power transmission companies in securing aerial conductor cables to pin or post type insulators.

PATENTED AUG 24 1971
3,601,527
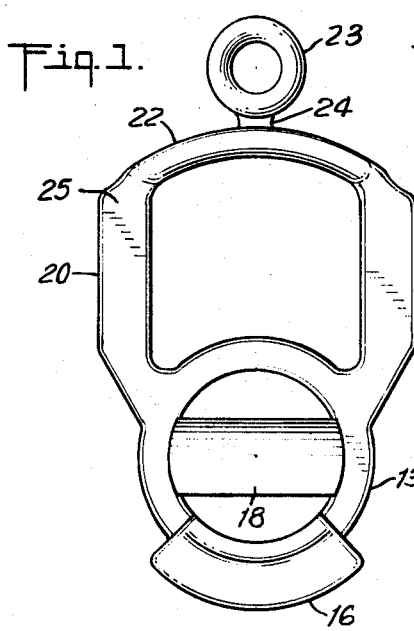
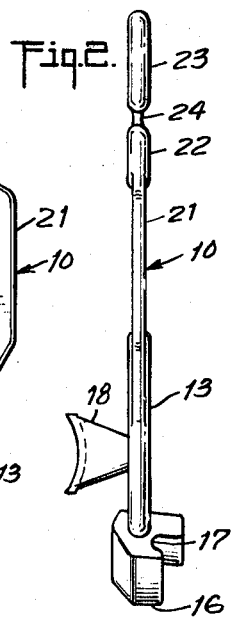
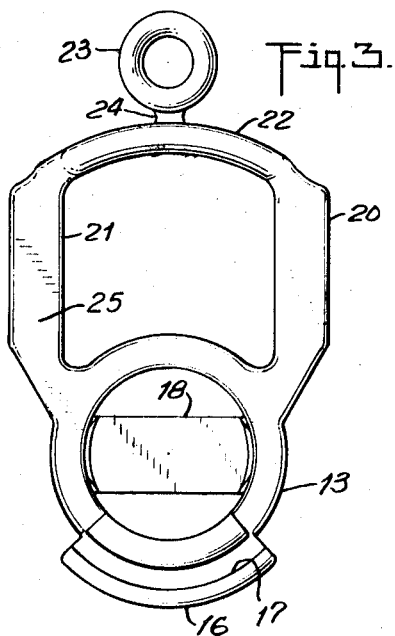
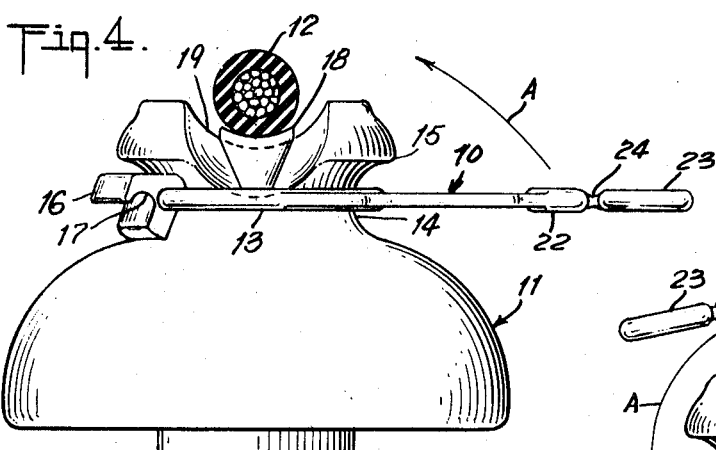
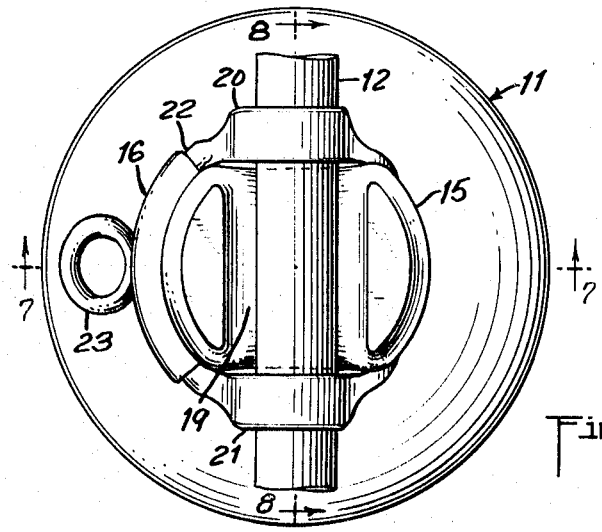
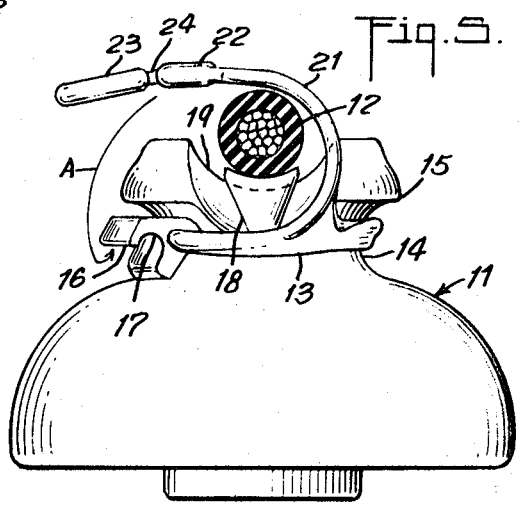
INVENTORS,
JAMES P. MARKHAM
JOHN F. JOST

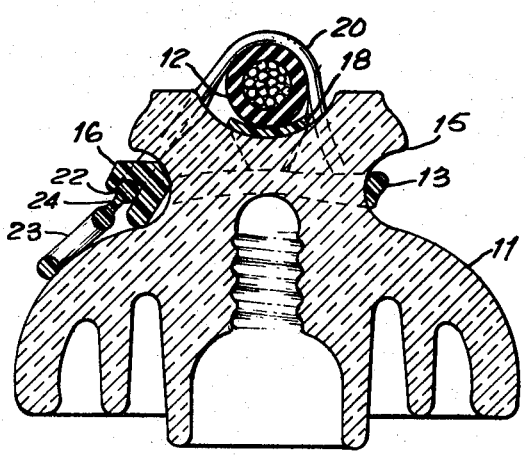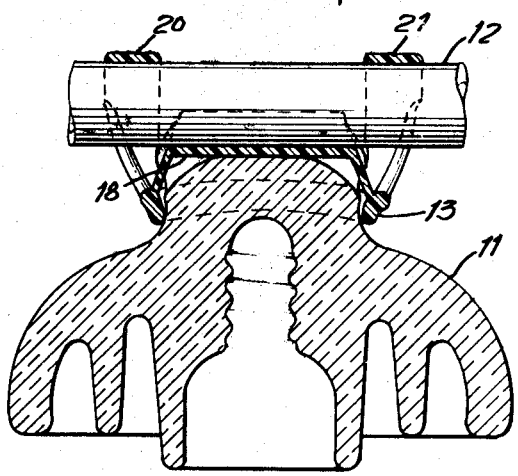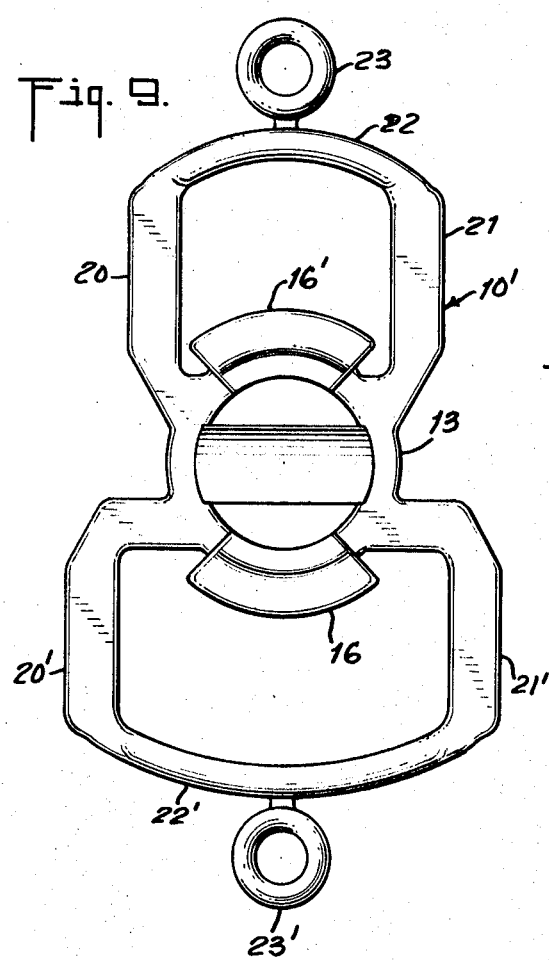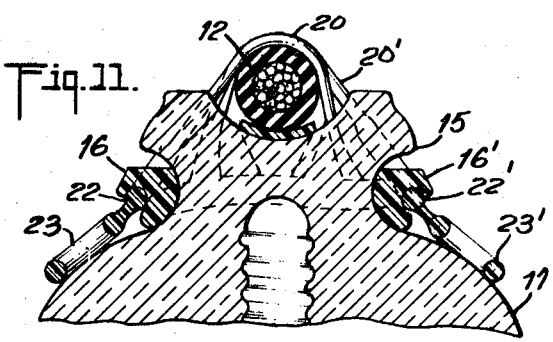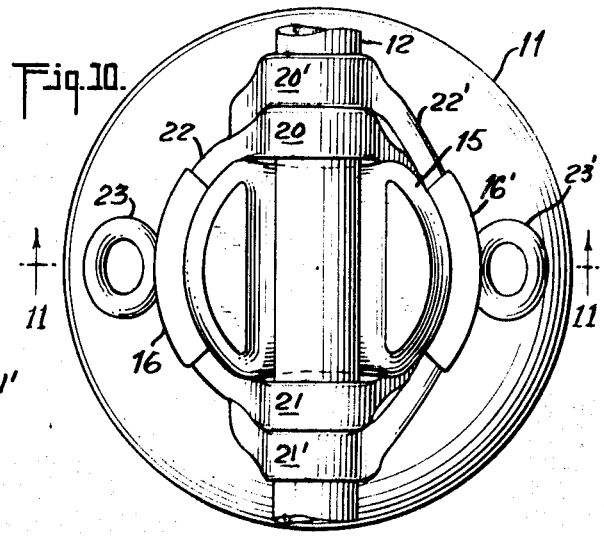

PATENTED AUG 24 1971 3,601,527

INVENTORS.
JAMES P. MARKHAM
JOHN F. JOST

AERIAL CABLE TIE

This invention relates to fastening means for securely seating aerial conductor cable to pin or post insulators, hereinafter simply referred to as an insulator support, and more particularly relates to elastomeric fastening means generally known in the art as cable "ties."

In the field of electrical power transmission, aerial conductor cables, which may either be bare or covered with a suitable insulating material, are strung from widely separated poles. These poles typically carry one or more insulators from each cable carried by these poles. A persistent problem which the utility companies constantly face is one of securing the conductive cable to its respective insulator support not only when it is not conducting electrical power, but also when it is conductive, for example, in effecting cable repairs without disrupting power transmission. Such repairs and cable securing, are conventionally done on "live" cables, i.e., electrically conducting cables, and is typically done by repair crews using "hot sticks," a term well known in the art. Preferably the means employed to effect such a securing of cable to insulator support requires not only that the fastener offer complete lateral support to prevent the cable from sliding off sideways, but it should also offer sufficient holding force in shear to prevent the cable from being pulled axially from its support in the event the cable becomes broken, thus resulting in an unbalanced unidirectional tension force.

It is, accordingly, among the various objects of this invention to provide an elastomeric aerial cable tie which will securely fasten an aerial conductor cable to its insulator support.

It is another object of this invention to provide an elastomeric aerial cable tie which engages a conductive cable with sufficient force to resist lateral as well as axial forces tending to unseat the cable from its support.

Another and further object of this invention is to provide an elastomeric aerial cable tie which can be manipulated into operative position not only with a person's hands, but also with so-called hot line tools, such as hot sticks.

With these and other objects in mind, reference is made to the accompanying drawings illustrating two practical embodiments of this invention and wherein:

FIG. 1 shows a top plan view of the tie here in disclosed;

FIG. 2 shows a side elevation view of the right side of FIG. 1;

FIG. 3 shows a bottom plan view of FIG. 1;

FIG. 4 illustrates a side elevation view of the here in disclosed tie operatively mounted on a typical cable insulator with the conductive cable shown in cross section;

FIG. 5 illustrates the structure of FIG. 4 with the beginning of the serving of the tie over the cable;

FIG. 6 illustrates the structure of FIG. 5 in top plan view with the tie down completed and locked in position;

FIG. 7 is a cross-sectional view taken on line 7—7 of FIG. 6;

FIG. 8 is a cross-sectional view taken on line 8—8 of FIG. 6;

FIG. 9 is an illustration of a second embodiment of the disclosed tie;

FIG. 10 is a top plan view of the tie shown in FIG. 9 in fully operative position securing a cable to the insulator;

FIG. 11 is a cross-sectional view taken on line 11—11 of FIG. 10;

Figure 12:
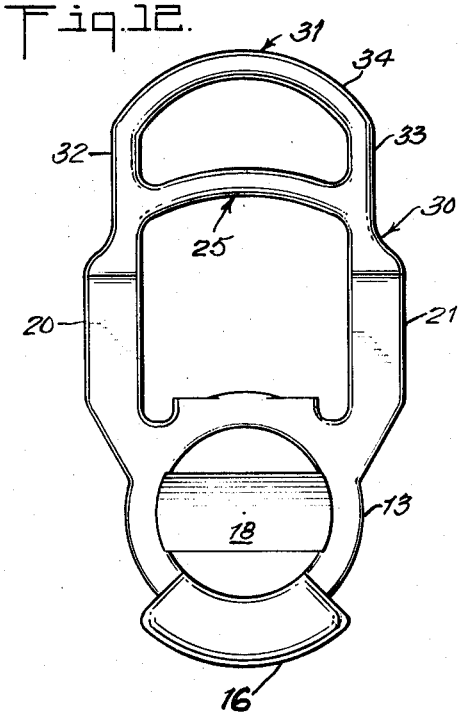
FIG. 12 illustrates a top plan view of a third embodiment of this tie.

Referring now with greater particularity to the drawings, there is illustrated in FIG. 4 a first embodiment of tie 10 molded as an integral, unitary structure from a suitable elastomeric material. This tie is shown mounted on a conventional porcelain insulator generally designated 11 with conductive cable 12 supported thereon. Tie 10 as shown in FIGS. 1–3 is generally comprised of a locking portion 13 of annular or other suitable shape and so dimensioned that it fits tightly around neck 14 of insulator 11. Because of its resilient characteristics, locking ring 13 is easily stretched so as to fit over the larger sized rim portion 15 of the insulator. Molded integrally with the front portion of locking ring 13 is a lip portion 16 with an undercut or recess 17 along its entire peripheral length.

Extending diametrically across locking ring 13 is saddle portion 18 suitably shaped to fit over block portion 19 of insulator 11 and designed wide enough to receive cable 12. Cable-engaging arms 20 and 21 extend outwardly from locking ring 13 and are interconnected at their out end by a connector or bridge 22. Though these arms 20, 21 are illustrated as being substantially parallel to each other, it is to be understood that they may also have a nonparallel disposition with respect to one another. For further convenience in describing this disclosure, the component comprised of arms 20, 21, and bridge 22 may be referred to as the cable engaging loop 25. Ring 23, connected to the cable loop by a short web 24, is optionally provided to be engaged by a hot stick in effecting and completing installation or repair of a "live" cable.

In operation the tie is initially secured on the insulator 11 by distending locking ring 13 to fit over rim 15 and on to neck 14 of the insulator. The tie is then oriented on the insulator so that lip portion 16 is oriented in a position which is generally parallel to the direction in which cable 12 will be running. Cable 12 is then suitably placed in position on saddle 18. Ring 23 is then grasped by the lineman's hot stick and the cable-engaging loop comprising arms 20, 21 and connector 22 are served over cable 12 whereby connector 22 is forced over and under lip 16 and into recess 17 in cooperative locking engagement therewith as shown by arrows A in FIGS. 4 and 5. It should be noted that the length of cable engaging arms 20, 21 in their "as molded" condition of FIG. 4 is shorter than their operative length shown in FIG. 6, so that as these arms are served over cable 12 to bring connector 22 into locking position with lip 16, considerable stretching and distention of their original length must be effected. Thus, the elastic tension in arms 20, 21, once they are in locking position, provides a substantial force component acting vertically downward against cable 12 holding it in compression against saddle 18.

FIGS. 9–11 show a second embodiment of this invention wherein there is provided a second set of cable-engaging arms and a corresponding locking arrangement thus resulting in a device which gives greater cable holding power and tie reliability. Referring more particularly to FIG. 9, there is illustrated a tie device 10' which is substantially identical, in part, to that described in FIGS. 1–3, with the addition of a second set of arms 2', 21', connector 22', locking lip 16', recess 17' and ring 23'. As seen in FIGS. 10 and 11, arms 20', 21' effectively duplicate the function and operation of arms 20, 21 and result in a vertical downward force against cable 12 which is additive to that of arms 20, 21. Thus, in light of the foregoing description, the double-loop embodiment of FIGS. 9–11 effectively doubles the holding power of cable 12 against the insulator 11 and offers an additional feature of reliability in that should either of the loops rupture, the remaining loop keeps cable 12 in an intact position with respect to insulator 11.

Figure 14:
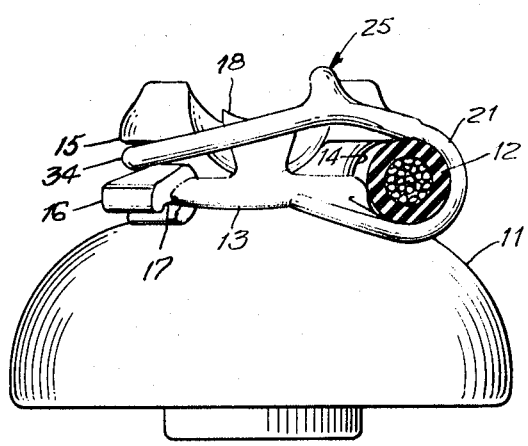
FIG. 14 illustrates an elevation view taken on line 14—14 of FIG. 13 and with the tie in its fully operative position.
Figure 13:
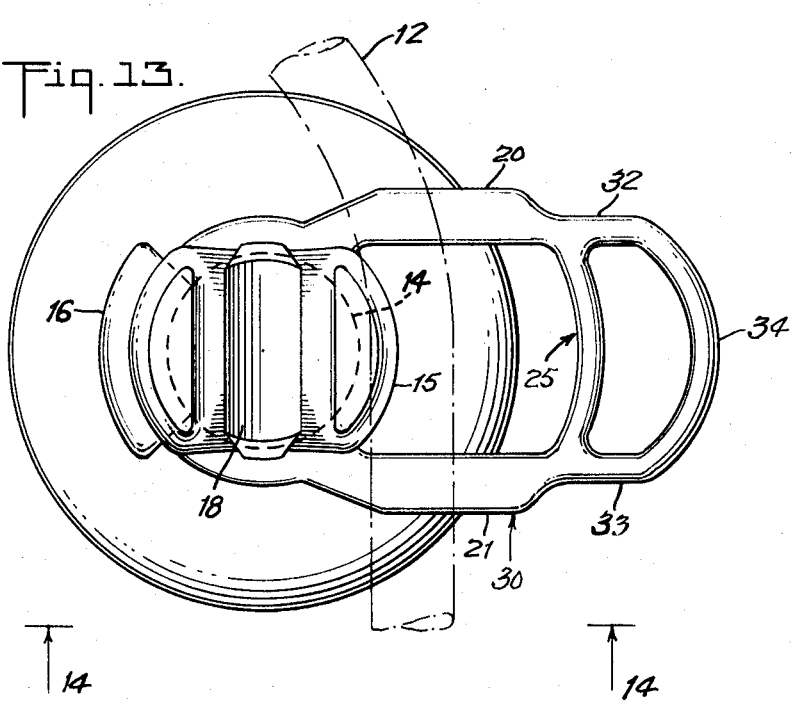
FIG. 13 illustrates a top plan view of the tie of FIG. 12 attached to an insulator.

A further embodiment of this device is shown in FIGS. 12–14 where there is illustrated a tie 30 which is basically identical, in part, to that device illustrated in FIG. 1. The structural features which distinguish this latter embodiment from that of FIG. 1 is the addition of another cable-engaging loop 31 to loop member 25. The addition of this second loop 31 serves to provide a more versatile tie structure which not only can secure a cable to the top portion of an insulator, as hereinbefore described, but will also secure a cable to the side or neck portion of a pin-type insulator. This side positioning of the cable, illustrated in FIGS. 13, 14 is necessary when the cable pivots around the insulator in order to change its direction of travel, that is, when it "turns a corner." Referring to FIG. 12, loop 31 comprised of arms 32, 33 and connector member 34, simply extend outwardly from loop 25. With cable 12 positioned against neck 14 as shown, the dual cable engaging loops 25, 31 are served over the cable and across the top of neck 14 with sufficient tension to stretch connector member 34 over the edge of rim 15 of the insulator neck, or, alternatively, over lip 16 and into locking engagement with recess 17 depending on the degree of tension required. This latter described embodiment may thus be used when cable 12 is positioned on top of neck 14, in the manner illustrated in FIG. 4 and also when the cable is positioned on the side of insulator 11, as illustrated in FIG. 14. Thus, the "double-loop" tie has universal application in fastening aerial cable to conventional pin or post type insulators.

It should be obvious that the elastomeric composition selected for this tie should exhibit those preferred physical and chemical characteristics of dielectric strength, tensile strength, tracking resistance and other features which are well known in the art.

From the foregoing, it is apparent that the tie structures disclosed are well adapted to attain the objects set forth above.

What is claimed and desired to be secured by Letters Patent is:

1. A flexible elastomeric tie member comprising:
   a. an annular locking means adapted for engagement with a cable insulator support;
   b. lip means integrally formed with and concentrically disposed around the outer peripheral portion of said locking means;
   c. recess means extending along the underneath peripheral portion of each said lip means; and
   d. loop means extending outwardly from said annular locking means oppositely disposed from each said lip means and adapted for cooperative locking engagement with said recess means.

2. The tie member set forth in claim 1 further comprising: a saddle portion diametrically disposed across said annular locking means.

3. The tie member set forth in claim 1 wherein said lip means consists of one lip and wherein said loop means comprises a double cable-engaging loop located oppositely thereto.

4. The tie member set forth in claim 1 wherein said lip means comprises at lest two lips oppositely disposed from one another and a corresponding number of loop means for respective engagement therewith.

5. In combination with an aerial cable insulator supporting an electrical conductor cable, an elastomeric tie wherein said tie comprises:
   a. insulator-engaging means securing said tie to the cable insulator;
   b. at least one pair of cable-engaging arm portions extending outwardly from said insulator-engaging means and served over the conductor cable;
   c. connector means conjoining at least the outer end portions of each pair of said arm portions; and
   d. means on said insulator-engaging means oppositely disposed from each pair of said arm portions cooperatively receiving each respective connector means in interlocking relation therewith.

6. The combination set forth in claim 5 further comprising: saddle means disposed across said insulator-engaging means upon which the cable is supported.

7. The combination set forth in claim 5 wherein said one pair of cable-engaging arm portions comprises a single cable-engaging loop.

8. The combination set forth in claim 5 wherein said one pair of cable-engaging arm portions comprises a double cable-engaging loop.